March 22, 1927.
H. J. ROUND
1,622,000
WIRELESS TELEGRAPH RECEIVING SYSTEM
Filed Feb. 2, 1923
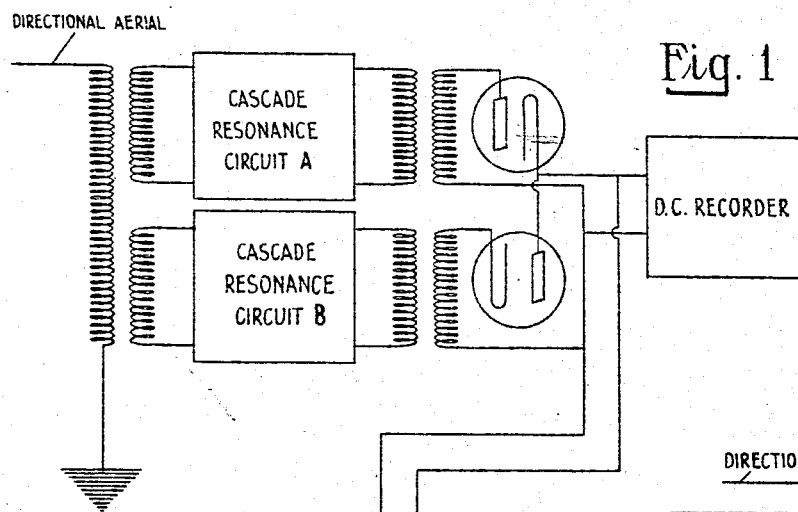
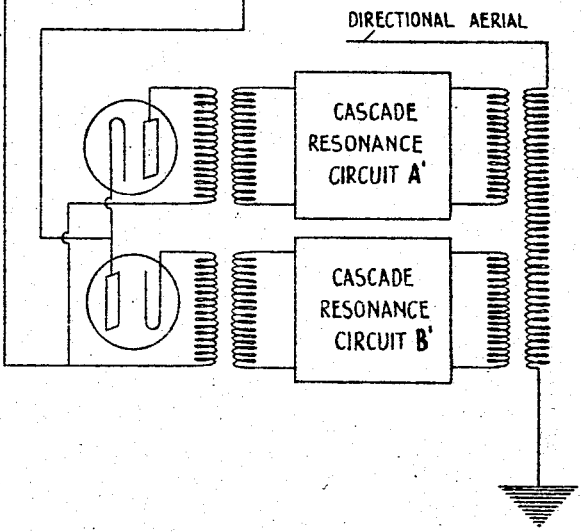
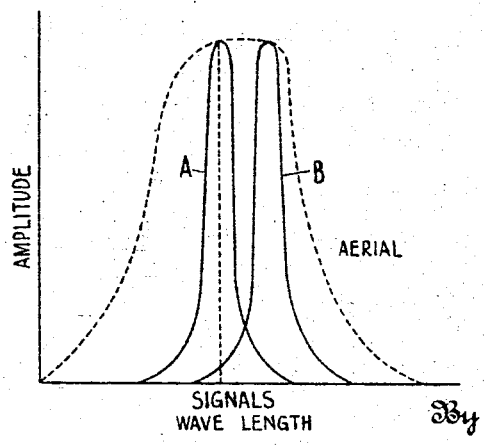
Inventor
HENRY JOSEPH ROUND
By his Attorney Patented Mar. 22, 1927.

1,622,000

UNITED STATES PATENT OFFICE.

HENRY JOSEPH ROUND, OF LONDON, ENGLAND, ASSIGNOR TO RADIO CORPORATION OF AMERICA, A CORPORATION OF DELAWARE.

WIRELESS-TELEGRAPH RECEIVING SYSTEM.

Application filed February 2, 1923, Serial No. 616,452, and in Great Britain February 21, 1922.

This invention relates to receiving systems for wireless telegraphy.

According to this invention the effects of atmospherics are eliminated in the following way:—

An aerial, preferably with the best directional properties known in the art, is coupled to two high frequency cascade resonance circuits which are so adjusted that their resonance curves are as similar as possible but just do not overlap one another, and so that one of the circuits is tuned to the signals while the other just avoids signals. Most aerials will be sufficiently aperiodic to be equally well in tune with both the circuits.

Any impulsive type of atmospheric will produce in the two resonance circuits equal effects differing only in frequency, but in the one circuit the signals will appear in addition to the atmospheric.

The result of an atmospheric at the end of such a cascade arrangement is more or less a modulated continuous wave, so that according to its phase it will add to or subtract from the signal wave in the one circuit, but will appear with its own representative amplitude in the other circuit. At the end of these two circuits are placed two rectifiers as accurately equalized as possible, whereby the result due to the signals and the atmospheric in the one circuit is rectified and substracted from the rectified atmospheric in the other circuit, so that only the difference is recorded.

During a spacing period between signals, there will be no marks on the record, because the atmospheric disturbances will substantially balance out owing to the fact that the oscillations set up in the various cascade circuits are of the same amplitude and phase and differ only slightly in frequency. The marking device of the recorder is arranged to be non-responsive to the comparatively small currents which exist as a result of the atmospheric oscillations being of slightly different frequency. Therefore every mark on the record should be read as a signal substantially at all times.

Moreover, in reading the record no attention need be paid to the amplitude or direction of the current, that is to say, a mark out of the zero line will mean the same whether it digresses a long or a short way from that line and whether it is on the positive or on the negative side. On which side of the zero line the mark is will depend upon the relation between the phase of the atmospheric and the phase of the signal. If they are in phase the effect will be additive and the mark will be positive on the record whereas if they are 180° out of phase the effect will be substractive and the mark will appear on the negative side.

There is, however, one special case to be considered and that is when the phase difference between the atmospheric and the signal and the strength of the atmospheric are such that the mark due to the signal lies on the zero line so that a spacing sign is imitated. Apart from this particular case whenever there is a mark recorded (positive or negative) a signal is present.

Thus an irregular morse is obtained having errors only in the particular case mentioned above with certain phases and strengths of atmospherics.

Such errors may, however, be avoided by employing another aerial, the directional properties of which are oriented exactly as in the first aerial but which is spaced by some fair proportion of the wave length away from the first one, but in any direction, a similar arrangement being connected to this second aerial; again there will be obtained an irregular amplitude morse having errors only in particular cases, but only in one case are the errors from the two aerials identical, that is, when the same atmospheric hits both aerials from the direction of the signals.

This direction is of course theoretically infinitely fine but practical considerations indicate that it is of a certain small angular width depending on the accuracy of balancing.

These two sets of differential effects obtained on the two aerials can be added together, resulting in an irregular amplitude morse which will show a space instead of a mark only when the atmospheric is of a certain amplitude, a certain phase and in the direction of signals.

In the drawings, Fig. 1 shows diagrammatically by way of example, a two aerial system embodying the features heretofore described, and Fig. 2 shows the relation of the resonance curves of the aerial and the cascade resonance circuits.

Having described my invention what I claim is:

1. In a wireless telegraph receiving system, the combination of two similarly oriented directional aerials spaced apart by some fair proportion of the wave length to be received, two cascade resonance circuits coupled to each aerial and so arranged that their resonance curves are similar and just do not overlap one another, one of the circuits being tuned to the signals to be received and the other being tuned so as just to avoid the signals, means for rectifying and opposing the currents at the ends of each pair of circuits and means for combining and recording the differences.

2. A method of indicating telegraphic signals which consists in recording the difference between two rectified received effects differing only as to their initial radio frequency, one of said frequencies being that of the signal and the other slightly different, recording the difference and reading the markings as signals irrespective of the actual difference between the rectified effects.

3. In a wireless telegraph receiving system the combination of a pair of directional aerials, a pair of systems each comprising a pair of similar circuits sharply resonant to slightly different frequencies, one of which is adapted to receive signal and the other to just avoid signal, means for rectifying and opposing the rectified currents, and means for combining and recording the resultants of the rectified effects of the two systems.

4. In a wireless telegraph receiving system, the combination of two aerials spaced apart by some fair proportion of the wave length to be received, two resonance circuits coupled to each aerial and so arranged that their resonance curves are similar and just do not overlap one another, one of the circuits being tuned to the signals to be received and the other being tuned so as just to avoid the signals, means for rectifying and opposing the currents at the ends of each pair of circuits and means for combining and recording the differences.

5. In a wireless telegraph receiving system the combination of two directional aerials spaced apart by a fraction of a wave length to be received, two resonance circuits coupled to each aerial, a detector coupled to each of said resonance circuits, and a recording device, all of said detectors being connected in parallel with said recording device.

6. In a wireless telegraph receiving system, the combination of a pair of directional aerials, a pair of systems each comprising a pair of circuits sharply resonant to slightly different frequencies, a separate detector associated with each one of said circuits, said detectors being arranged in pairs and each detector of a pair being arranged to oppose the output of its complementary detector, and means to record the resultant detected current.

7. In a wireless telegraph receiving system, the combination of two similarly oriented directional aerials, two cascade resonance circuits coupled to each aerial and so arranged that their resonance curves are similar and just do not overlap one another, one of the circuits being tuned to the signals to be received and the other being tuned just to avoid the signals, a pair of detector devices associated with each cascade resonance circuit, each pair of detectors being arranged to oppose the output of its associated resonance circuits, and a recording device, said detectors being connected in parallel with said recording device.

HENRY JOSEPH ROUND.